United States Patent [19]

Kobayashi et al.

[11] Patent Number: 5,138,540
[45] Date of Patent: Aug. 11, 1992

[54] VARIABLE LIGHT DISTRIBUTION TYPE HEADLAMP

[75] Inventors: Syoji Kobayashi; Michihiko Hayakawa, both of Shizuoka, Japan

[73] Assignee: Koito Manufacturing Co., Ltd., Tokyo, Japan

[21] Appl. No.: 689,427

[22] Filed: Apr. 23, 1991

[30] Foreign Application Priority Data

Apr. 24, 1990 [JP] Japan ............................. 2-43088[U]
Apr. 27, 1990 [JP] Japan ............................. 2-44538[U]

[51] Int. Cl.$^5$ ............................................. F21V 13/00
[52] U.S. Cl. ................................... 362/268; 362/61; 362/277; 362/319
[58] Field of Search ................... 362/61, 80, 268, 277, 362/307, 308, 310, 319, 280

[56] References Cited

U.S. PATENT DOCUMENTS

| | | | |
|---|---|---|---|
| 4,345,303 | 8/1982 | Gerard et al. | 362/80 |
| 4,739,456 | 4/1988 | Little | 362/268 |
| 4,771,372 | 9/1988 | Litetar et al. | 362/307 |
| 5,068,768 | 11/1991 | Kobayashi | 362/61 |

Primary Examiner—Stephen F. Husar
Attorney, Agent, or Firm—Sughrue, Mion, Zinn, Macpeak & Seas

[57] ABSTRACT

A variable light distribution type headlamp which provides an optimum irradiated beam pattern under all driving conditions. The headlamp includes a projector lamp, a fixed lens, and a movable lens disposed on the optical axis of said projector lamp forward of said projector lamp. The movable lens is a condensing lens, and the fixed lens being a cylindrical concave lens. The focal length and a range of movement of the movable lens are such that front focal points of the movable and fixed lenses coincide when both lenses are close to each other. A lens drive mechanism controls the position of the movable lens in both X and Y directions so as to respectively control the amount of beam diffusion and beam direction in accordance with the vehicle speed and steering direction.

12 Claims, 5 Drawing Sheets

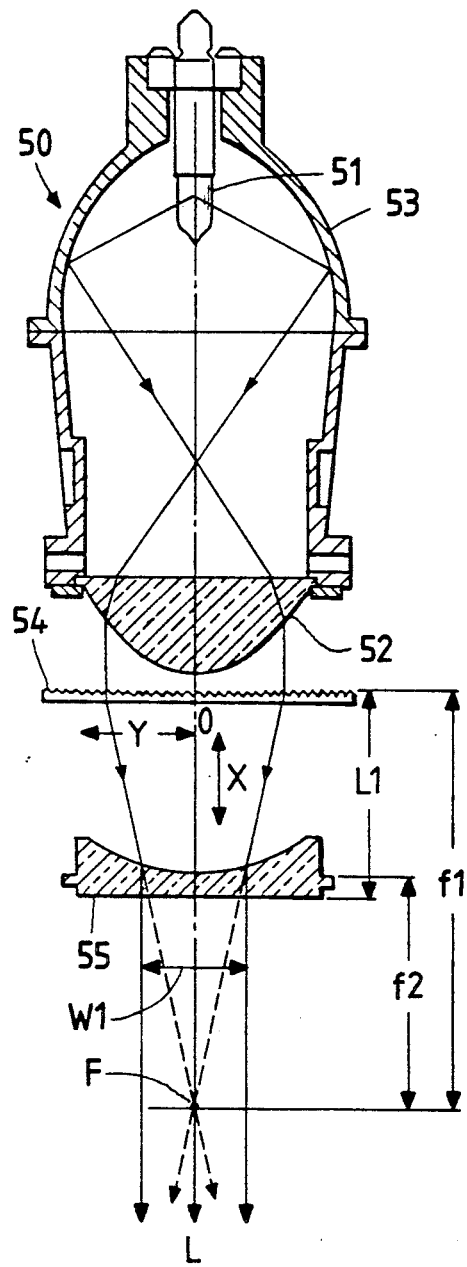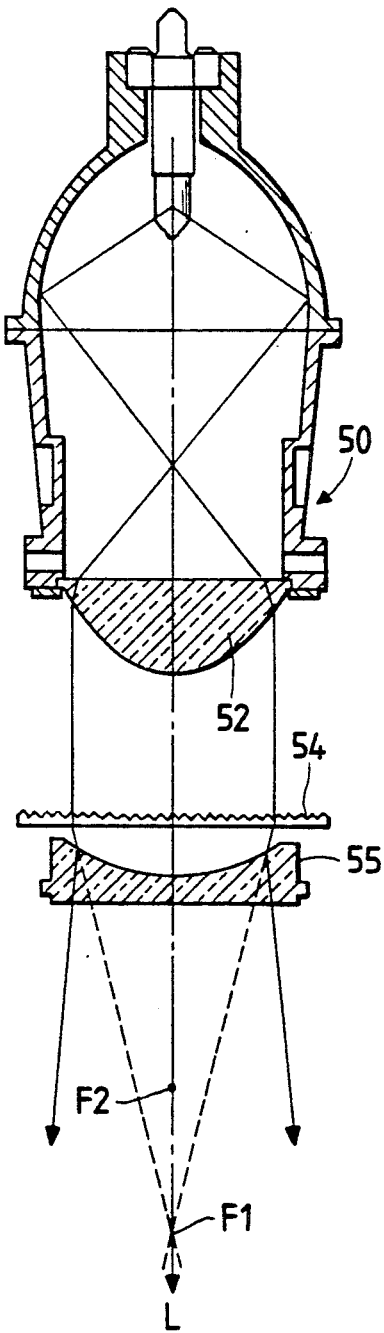

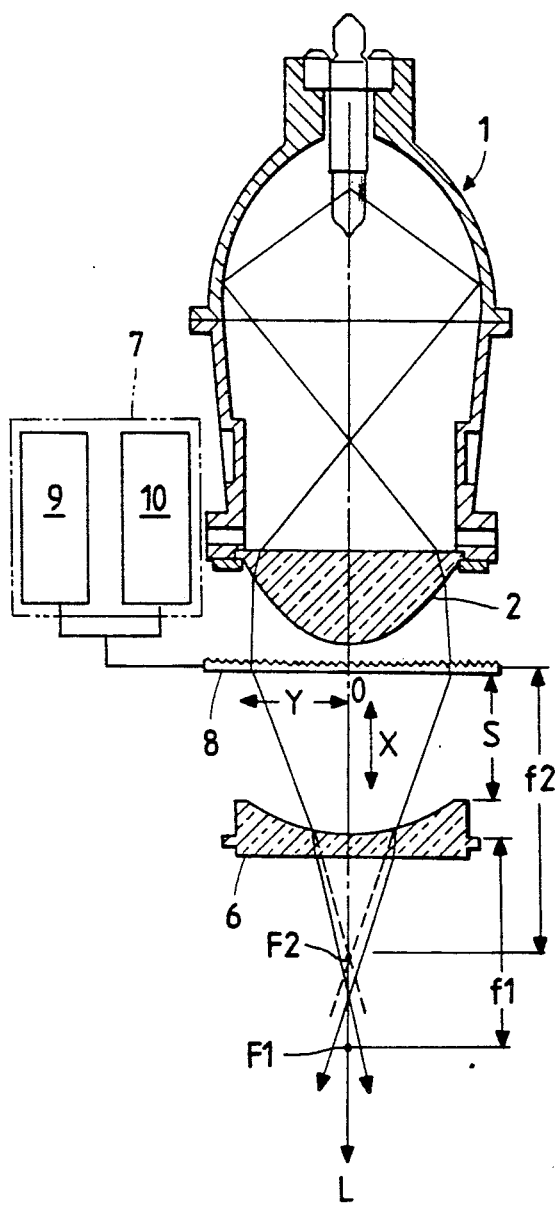
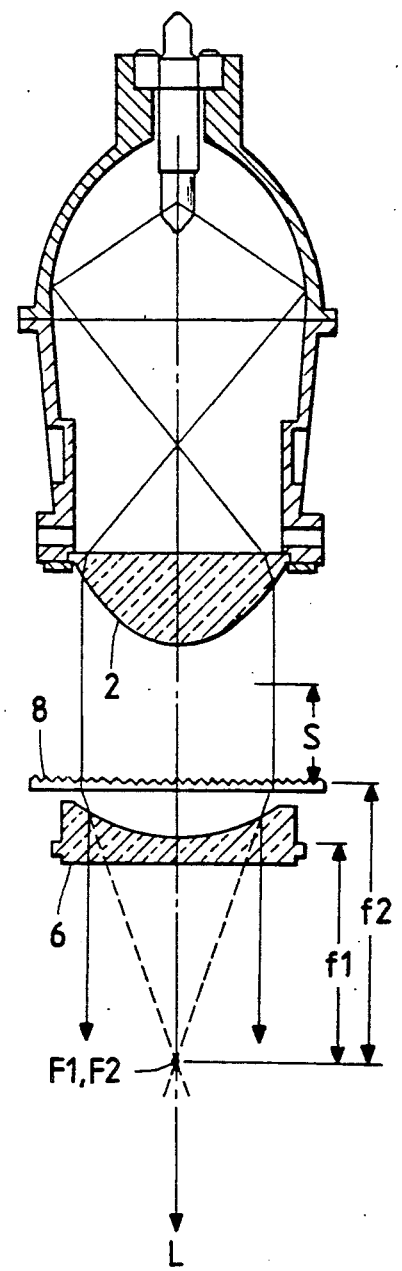

VARIABLE LIGHT DISTRIBUTION TYPE HEADLAMP

BACKGROUND OF THE INVENTION

The present invention relates to a variable light distribution type headlamp, particularly an automotive headlamp, having a lens drive device for variably controlling the degree of convergence (amount of diffusion) and the angle of the irradiated beam.

A lighting apparatus of the type shown in FIGS. 1(a) and 1(b) has conventionally been employed for controlling the light distribution pattern of the irradiated beam of an automotive headlamp. As shown in these figures, the apparatus includes projector lamp 50 for emitting a parallel beam, a movable lens 54, and a fixed lens 55 disposed on the front optical axis L of the projector lamp 50 and movable lens 54. The projector lamp is composed of a light source bulb 51, a collimator lens 52, and a reflector 53 having an elliptical reflecting surface. The movable lens 54 is driven in the direction of arrows X or Y so as to control the light distribution pattern by converging/diffusing or inclining the beams in consideration of the positional relation between the lenses.

In the automotive headlamp of this type, however, there has been employed a combination of two lenses to reduce the length of the lighting apparatus, namely, a condensing lens (of focal length f1) as the movable lens 54 and a cylindrical concave lens (of focal length f2) as the fixed lens 55. As shown in FIG. 1(a), when the focal points F1 and F2 of the two lenses coincide at a position where the movable lens 54 and the fixed lens 55 are spaced apart from one another, a parallel irradiated beam is produced, thereby forming a spot-type distribution pattern. As shown in FIG. 1(b), when the focal points F1 and F2 of the two lenses are shifted apart by disposing the movable lens 54 close to the fixed lens 55, a diffused light distribution pattern is obtained.

With the arrangement described above, however, since the movable lens 54 is separated from the fixed lens 55 by a distance L1 when the spot pattern of FIG. 1(a) is obtained, the width W1 of the irradiated beam decreases as the beam incident on the fixed lens 55 is converged to a small beam diameter, which makes it difficult to control the light distribution pattern of the irradiated beam by means of the fixed lens 55. Thus, pattern irregularities are likely to occur.

Moreover, when the diffused light distribution pattern of FIG. 1(b) is selected, because the aspherical surface of the concave lens used as the fixed lens 55 greatly varies in shape in the central portion of the lens and varies less in the peripheral portion thereof, even though the movable lens 54 is set closer to the fixed lens, the range of diffusion may not be increased sufficiently.

Moreover, the conventional variable distribution type headlamp requires a complicated lens drive mechanism, making the overall lamp assembly large in size. Such headlamps cannot, as a practical matter, be used in vehicles where there is only a limited amount of space for the installation of the headlamp.

SUMMARY OF THE INVENTION

Therefore, an object of the present invention is to solve the foregoing problems and provide a lens device for a variable light distribution type headlamp wherein a beam is incident on the entire surface area of a fixed lens when a spot distribution pattern is selected to thus facilitate the control of the light distribution pattern, and wherein, when a diffused light distribution pattern is selected, the diffusing range of the beams can be enlarged.

Another object of the present invention is to provide a variable distribution type headlamp which is capable of emitting a diffused irradiated light beam when the vehicle on which it is mounted is traveling at ordinary speeds and a spot beam when traveling at high speeds, and in which the irradiated beam can be swung in the direction of steering of the vehicle so that an optimum irradiated light beam is automatically produced at all times.

In order to achieve the above and other objects, a variable light distribution type headlamp is provided having a lens drive device in which two lenses are provided on the optical axis in front of a projector lamp to variably control the light distribution pattern of the irradiated light by varying the distance between the two lenses and/or the positions thereof, the one of the two lenses on the projector lamp side being a movable lens formed by a condensing lens, and the other on the front side being a fixed lens formed by a cylindrical concave lens, wherein the focal length and range of movement of the movable lens are such that the front focal points of the movable and fixed lenses coincide when the two lenses are set close to one another. The substantially parallel beam emitted by the lamp is condensed toward the concave lens by the condensing lens.

It is preferred that the movable lens formed by the condense lens be a Fresnel-type lens whose shape toward the lens steps thereof is aspherical in section. The Fresnel-type lens may be in a substantially flat plate-like shape.

With the arrangement described above where the focal position of the movable lens coincides with the front focal point of the fixed lens when the movable lens is close to the fixed lens, the beam incident on the fixed lens is prevented from being converged to a small diameter when the movable lens (Fresnel lens) is moved close to the fixed lens by a lens drive mechanism. Consequently, the width of the irradiated beam when the spot pattern is selected is not excessively narrowed, and hence control of the light distribution pattern by the fixed lens is facilitated.

Moreover, the focal lengths of the two lenses thus designed results in making the focal length of the movable lens shorter than that of conventional lenses, which results in an increase of the diffusing range of the beams when the diffused light distribution pattern is selected.

In order to further achieve the above and other objects, a variable light distribution type headlamp is provided having a lens drive device in which two lenses, one being a fixed lens and the other a movable lens, are provided on the optical axis in front of a projector lamp, the light distribution pattern of the irradiated light is variably controlled by moving the movable lens so as to vary the distance between the two lenses, and the direction of the beam is variably controlled by moving the movable lens perpendicular to the optical axis of the projector lamp, wherein the movable lens is fixed to a lens mount, one end of the lens mount is threadedly engaged with a Y-axis screw shaft which is rotatably supported by a lens carrier, the lens carrier, which is slidably mounted to move in the X direction, is threadedly engaged with an X-axis screw shaft extending parallel to the optical axis, the X-axis shaft is coupled through a rotary transmission mechanism to an X-axis drive motor, a tubular shaft extends parallel to the optical axis, one end of a slide shaft retractably extends into the tubular shaft, the slide shaft rotating together with the tubular shaft, the tubular shaft is coupled to the Y-axis shaft through a rotary transmission mechanism, and the tubular shaft is rotated by a Y-axis drive motor via another rotary transmission, whereby the movable lens can be independently moved in the X and Y axes.

In the above-described arrangement wherein the fixed lens and the movable lens are mounted on the optical axis of the parallel beam produced by the projector lamp, the distance between the two lenses can be varied by operating the X-axis drive motor, while the movable lens can be displaced perpendicular to the optical axis by operating the Y-axis drive motor. Consequently, both the amount of diffusion and the direction of the irradiated beam can be readily controlled by operating the X- and Y-axis motors. By operating the X- and Y-axis motors in accordance with signals indicative of the vehicle speed and steering direction, respectively, an optimum beam pattern and direction are automatically produced.

BRIEF DESCRIPTION OF THE DRAWINGS

FIGS. 1(a) and 1(b) are diagrams of the principles of a conventional lens system;

FIG. 2 is a diagram showing the position of a lens system when a diffused irradiation pattern is selected, illustrating the principles of a lens device for a variable light distribution type headlamp embodying the present invention;

FIG. 3 is a diagram illustrating the lens positions when spot irradiation is selected;

DESCRIPTION OF THE PREFERRED EMBODIMENTS

Figure 4:
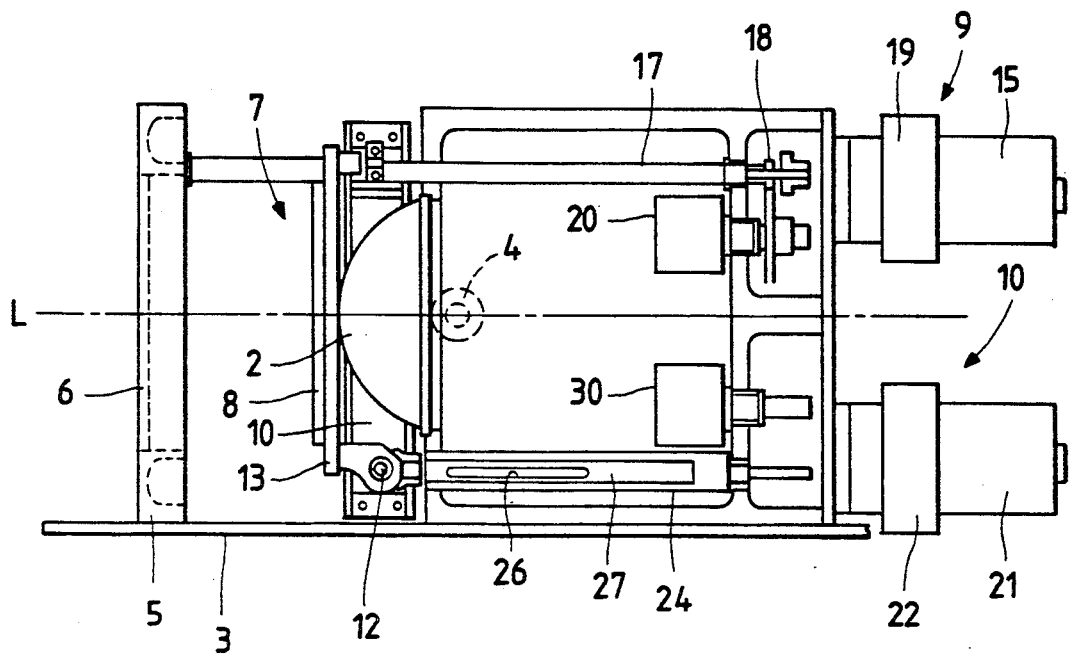
FIG. 4 is a side sectional view of a drive mechanism for the movable lens embodying the present invention.
Figure 5:
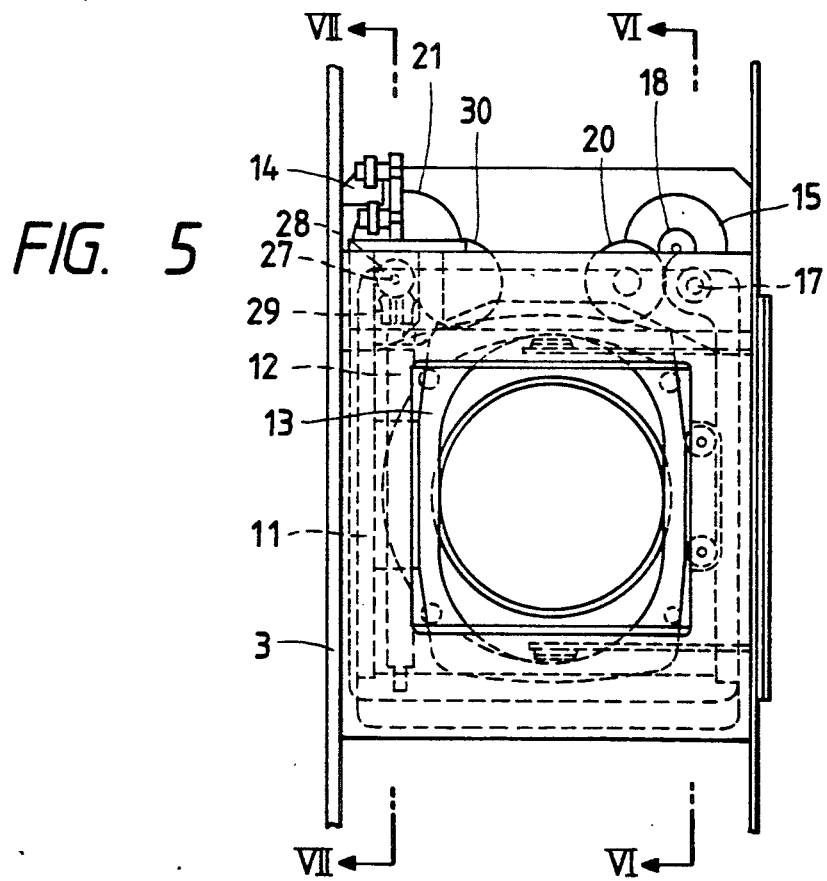
FIG. 5 is an elevational view of the drive mechanism of FIG. 4.
Figure 6:
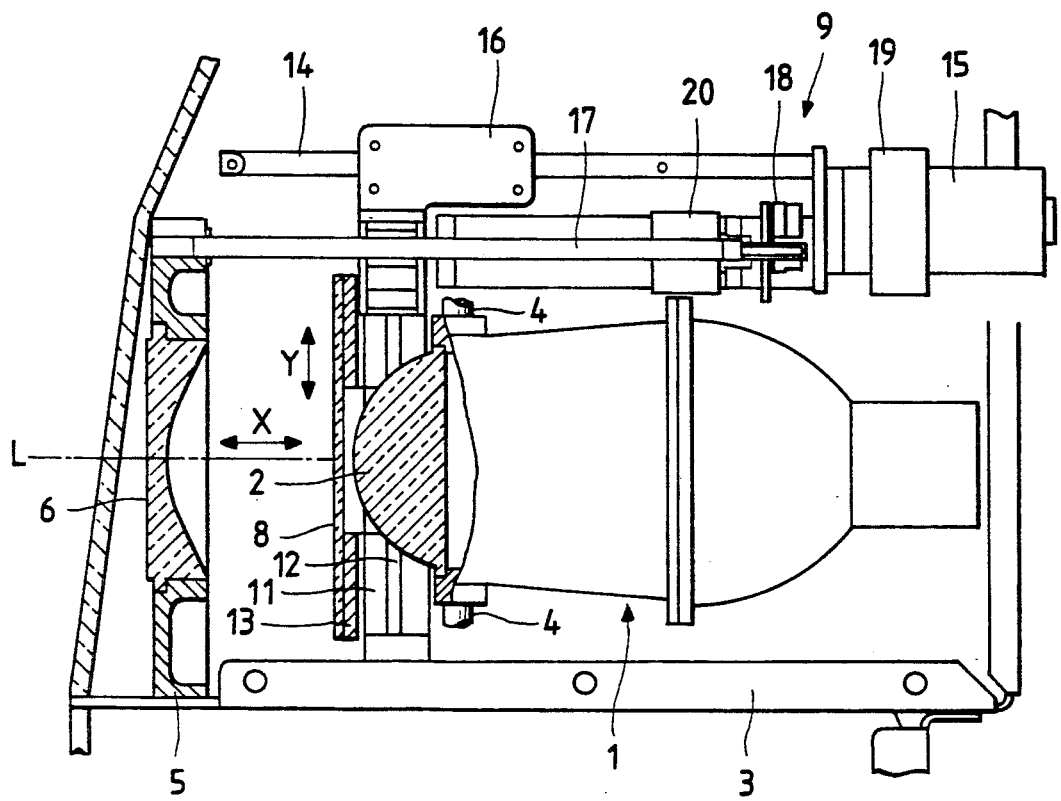
FIG. 6 is a partially cut-away top view illustrating an X-axis drive taken on a line VI—VI in FIG. 4.
Figure 7:
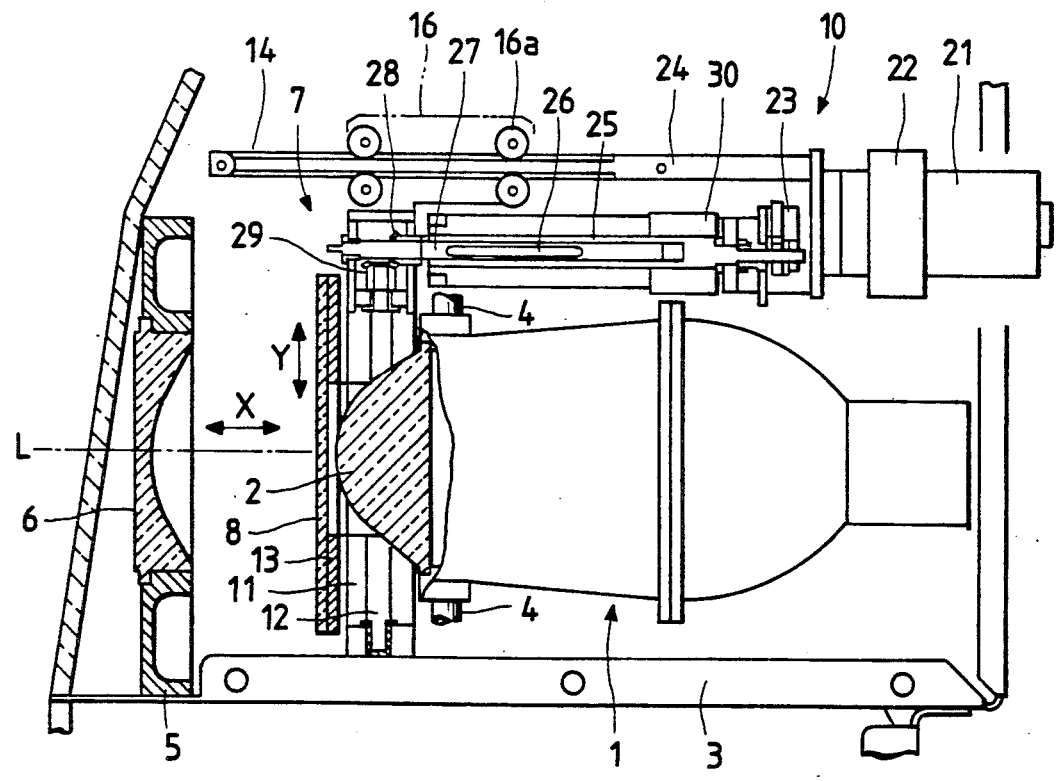
FIG. 7 is a partially cut-away top view illustrating an Y-axis drive mechanism taken on a line VII—VII in FIG. 4.

The principles of a lens device for a variable light distribution type headlamp according to the present invention will subsequently be described with reference to FIGS. 2 and 3.

FIGS. 2 and 3 illustrate a lens system with a movable lens which is to be set at respective positions for producing diffused and spot irradiation patterns. A projector lamp 1 emits a beam parallel to an optical axis L via a collimator lens 2. A cylindrical concave lens 6 having a focal point F1 and focal length f1 is fixedly mounted on the optical axis L in front of the collimator lens 2. A movable lens 8 is provided between the cylindrical concave lens 6 and the collimator lens 2. The movable lens 8 is driven in the directions of arrows X and Y by a drive mechanism 7, which will be described in detail below. The movable lens 8 is a Fresnel lens having a front focal point F2 and focal length f2, with a displacement range S in the direction of the arrow X.

The movable lens 8 is driven by an X-axis drive of the lens drive mechanism 7 within the range S. The focal positions F1 and F2 of the lenses 6 and 8, respectively, do not coincide at a marginal position on the side of the collimator lens 2, whereas the focal positions F1 and F2 coincide at a marginal position on the side of the fixed lens 6.

More specifically, when the focal positions F1 and F2 of the respective lenses 6 and 8 do not coincide (FIG. 2), the irradiated beam, which is converged by the movable lens 8 toward the focal point F2, becomes a diffused beam having a certain angle to the optical axis L after passing through the fixed lens 6. With respect to the beam incident on the fixed lens 6, the refractive action increases because of the curvature of the fixed lens 6, thus causing the diffusion angle to increase as the movable lens 8 is moved away from the fixed lens 6, while the beam converges in the vicinity of the optical axis L of the fixed lens 6.

When the focal positions F1 and F2 of the lenses 6 and 8 coincide (FIG. 3), the irradiated beam, converged by the movable lens 8 toward the focal point F2, becomes a beam parallel to the optical axis L after passing through the fixed lens 6. The beam incident on the fixed lens 6 then is almost free from convergence as the movable lens 8 is located close to the fixed lens 6, enlarging the front irradiated beam. In this case, a Y-axis drive 10 can be used to laterally swing the front irradiated beam to the right or left in correspondence with the steering angle of the vehicle, as will be described in more detail below.

A description will subsequently be given of a preferred embodiment of a movable lens drive mechanism 7 for implementing the principles discussed above with reference to FIGS. 4 to 7, inclusive.

As shown in FIGS. 4 to 7, the projector lamp 1, which emits a parallel beam centered on the optical axis L via the collimator lens 2, is pivotably attached via aiming shafts 4 protruding from the two sides of the projector lamp 1 to a lamp unit case 3 in such a way that the position of the projector lamp 1 can be changed through an angle of about ±5°. The cylindrical concave lens 6 having a focal point F is fixedly secured via a lens frame 5 to the lamp unit case 3 on the front optical axis L of the collimator lens 2, and the movable lens 8, which is formed by a Fresnel convex lens, is slidably mounted between the cylindrical concave lens 6 and the collimator lens 2 via the lens drive mechanism 7, which will subsequently be described.

As shown in FIG. 2, the lens drive mechanism 7 is employed for moving the movable lens 8 both in the direction of the optical axis L (in the direction of the arrow X) and in the lateral direction (in the direction of the arrow Y) perpendicular to the optical axis L. To effect this movement, the movable lens 8 is driven by an X-axis drive 9 and a Y-axis drive 10. Within the displacement range in the X-axis direction of the movable lens 8, there is a position of the movable lens 8 where the focal point F1 of the Fresnel convex lens and the focal point F2 of the cylindrical concave lens 6 coincide when the two lenses are close to one another.

The movable lens 8 is fixed to a lens mount 13. One end of the lens mount 13 is threadedly engaged with a Y-axis screw shaft 12 rotatably mounted on one side of a lens carrier 11, whereby rotation of the Y-axis screw shaft 12 moves the movable lens 8 perpendicular to the optical axis L. One end of the lens carrier 11 is secured to a bearing holder 16 slidably fitted via a ball bearing 16a to a Y-axis guide 14, the latter being fixed to the lamp unit case 3 and extending parallel to the optical axis L, the bearing holder 16 being slidable in the guiding direction.

In the X-axis drive 9, one end of the lens carrier 11 is threadedly engaged with an X-axis screw shaft 17, which is rotatably supported on the lens frame 5 and extends parallel to the optical axis L. The X-axis screw shaft 17 is rotated via a drive gear 18 and a reduction mechanism 19 by means of an X-axis DC drive motor 15, thereby to move the movable lens 8 in the X direction.

Figure 8:
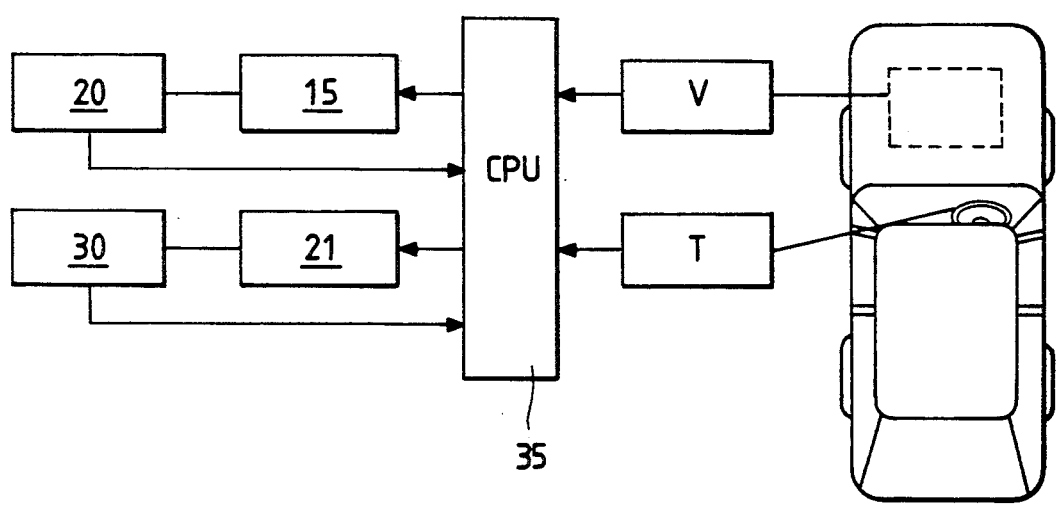
FIG. 8 is a block diagram illustrating a lens drive system used in the practice of the invention.

The position of the movable lens 8 in the X direction is detected by an X-axis potentiometer 20 whose input shaft gear is engaged with the drive gear 18. As indicated by the block diagram of FIG. 8, the position signal so produced is fed back to a drive control mechanism, which is implemented with a CPU along with a speed signal V from a vehicle speed sensor, so that the movable lens 8 is displaced (in the direction of the arrow X) to a position corresponding to the vehicle speed.

The Y-axis drive 10 includes a rotatable tubular shaft 24 rotated by a Y-axis drive DC motor 21 via a reduction mechanism 22 and a drive gear 23, with the tubular shaft 24 extending parallel to the optical axis L. The rear end of a slide shaft 27, the front end of which is rotatably supported by the lens carrier 11, is slidably fitted in the tubular shaft 24. The slide shaft 27 is made to rotate with the tubular shaft 24 by engagement of a drive pin 25 fixed to the slide shaft 27 and a slot 26 formed in the tubular shaft 24.

A bevel gear 28 at the forward end of the slide shaft 27 is engaged with a bevel gear 29 at one end of the Y-axis screw shaft 12, the latter being rotatably mounted on one side of the lens carrier 11, to thereby rotatably couple the shafts 24 and 12. The Y axis screw shaft 12 is turned by the Y-axis drive DC motor 21 clockwise and counterclockwise to move the movable lens 8 in the Y direction utilizing a screw action with respect to the lens mount 13.

The position of the movable lens in the Y direction is detected by a Y-axis potentiometer 30 whose input shaft is engaged with the drive gear 23. As further indicated in FIG. 8, a position signal so produced is fed back to the drive control mechanism together with a position signal T from a turning angle sensor coupled to the steering wheel of the vehicle, whereby the movable lens 8 is displaced (in the direction of the arrow Y) to a position corresponding to the steering angle of the vehicle.

With the arrangement described above, the following effects are obtained:

(1) The movable lens 8 is displaced in the X direction in proportion to the vehicle speed, whereby the distance between the movable lens 8 and the cylindrical concave lens 6 is caused to increase or decrease. As a result, the amount of lateral diffusion of the irradiated beam is made to increase or decrease in accordance with the distance between the focal points F1 and F2 of the two lenses. (In the embodiment shown, the irradiated beam is diffused by the movable lens 8 in the vertical direction at all times.)

(2) The movable lens 8 is displaced in the Y direction in proportion to the steering angle of the vehicle, whereby the relative position of the movable lens 8 and the cylindrical concave lens 6 in the lateral direction is shifted such that the irradiated beam is deflected to the right or left in agreement with the steering angle of the vehicle.

In the initial installation of the headlamp, or to later correct the alignment the headlamp, the aiming shafts 4 can be rotated to adjust the angle of the projector lamp 1 relative to the lamp case 3.

Although DC motors are used in the X- and Y-axis drives in the above embodiment, it is needless to say possible to employ other motors such as step motors capable of bidirectional driving.

In the lens device for a variable light distribution type headlamp thus constructed according to the present invention, the displacement range of the movable lens is set by the lens drive mechanism in the optical axis direction in such a way that the focal point of the movable lens coincides with the front focal point of the fixed lens when both lenses are set close to each other. For this reason, the beam is less converged by the movable lens, and consequently the width of the irradiated beam during spot irradiation is prevented from being narrowed. Hence, the control of the light distribution pattern by the fixed lens is accordingly facilitated. Moreover, the focal lengths of the two lenses thus designed results in making the focal length of the movable lens shorter than that of a conventional lens, thereby increasing the diffusing range of the irradiated beams for diffusing light distribution.

Further, both the amount of diffusion of the irradiated beam and the direction of the irradiated beam can be automatically controlled in accordance with the speed and steering angle of the vehicle. This greatly adds to vehicle safety. The invention also results in a simplified lens drive mechanism, and allows the overall size of the headlamp to be reduced.

What is claimed is:

1. A variable light distribution type headlamp comprising: a projector lamp, a fixed lens, and a movable lens disposed on the optical axis of said projector lamp forward of said projector lamp, said movable lens being a condensing lens, said fixed lens being a cylindrical concave lens, a focal length and a range of movement of said movable lens being such that front focal points of said movable and fixed lenses coincide when both lenses are close to each other.

2. The variable light distribution type headlamp as claimed in claim 1, wherein said movable lens is a Fresnel lens.

3. The variable light distribution type headlamp as claimed in claim 2, wherein a shape of said movable lens toward lens steps thereof is aspherical.

4. A variable light distribution type headlamp comprising: a projector lamp; a fixed lens and a movable lens disposed on an optical axis of said projector lamp forward of said projector lamp, the light distribution pattern of an irradiated light beam produced by said lamp being controlled by moving said movable lens so as to vary the distance between said fixed and movable lenses, and the direction of said irradiated beam being controlled by moving said movable lens perpendicular to said optical axis of said projector lamp; a lens mount, said movable lens being fixed to said lens mount; a lens carrier, said lens carrier being slidably mounted to slide in a direction of an X-axis extending parallel to said optical axis; a Y-axis screw shaft, said Y-axis screw shaft being rotatably supported by said lens carrier and extending in a direction perpendicular to said X-axis, one end of said lens mount being threadedly engaged with said Y-axis screw shaft; an 17 X-axis screw shaft extending parallel to said optical axis, said lens carrier being threadedly engaged with said X-axis screw shaft; an X-axis drive motor; a Y-axis drive motor; a first rotary transmission mechanism for rotationally coupling said X-axis drive shaft to said X-axis motor; a tubular shaft extending parallel to said optical axis; a slide shaft, one end of said slide shaft slidably extending into said tubular shaft, said slide shaft rotating together with said tubular shaft; a second rotary transmission mechanism for rotationally coupling said slide shaft to said Y-axis drive shaft; and a third rotary transmission mechanism for rotationally coupling said tubular shaft to said Y-axis drive motor, wherein the light distribution pattern of said irradiated beam is variably controlled by operating said X-axis drive motor to move said movable lens so as to vary the distance between said movable and fixed lenses, and the direction of said beam is variably controlled by moving said movable lens perpendicular to said optical axis of said projector lamp by operating said Y-axis motor.

5. The variable light distribution type headlamp as claimed in claim 4, wherein said movable lens is a condensing lens, and said fixed lens is a cylindrical concave lens.

6. The variable light distribution type headlamp as claimed in claim 5, wherein a focal length and a range of movement of said movable lens are such that front focal points of said movable and fixed lenses coincide when said movable and fixed lenses are close to each other.

7. The variable light distribution type headlamp as claimed in claim 6, wherein said movable lens is a Fresnel lens.

8. The variable light distribution type headlamp as claimed in claim 7, wherein a shape of said movable lens toward lens steps thereof is aspherical.

9. The variable light distribution type headlamp as claimed in claim 4, wherein said slide shaft has a pin fixed thereto slidably received in a slot formed in said tubular shaft, whereby said slide shaft can slide with respect to said tubular shaft but rotates together with said tubular shaft.

10. The variable light distribution type headlamp as claimed in claim 4, further comprising a pair of pivot shafts for tiltably mounting said projector lamp.

11. The variable light distribution type headlamp as claimed in claim 4, wherein a forward end of said slide shaft is rotatably supported on said lens carrier.

12. The variable light distribution type headlamp as claimed in claim 4, further comprising: a bearing holder, one end of said lens carrier being secured to said bearing holder; a Y-axis guide extending parallel to said optical axis, said bearing holder being slidably fitted to said Y-axis guide.

* * * * *